United States Patent
Cho et al.

(10) Patent No.: US 11,468,571 B2
(45) Date of Patent: Oct. 11, 2022

(54) APPARATUS AND METHOD FOR GENERATING IMAGE

(71) Applicant: SAMSUNG ELECTRONICS CO., LTD., Suwon-si (KR)

(72) Inventors: Eun Ae Cho, Suwon-si (KR); Gihoon Park, Suwon-si (KR); SaeEun Choi, Suwon-si (KR); Sangshin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 87 days.

(21) Appl. No.: 16/891,202

(22) Filed: Jun. 3, 2020

(65) Prior Publication Data

US 2021/0012503 A1  Jan. 14, 2021

(30) Foreign Application Priority Data

Jul. 10, 2019  (KR) .................. 10-2019-0083437

(51) Int. Cl.
*G06K 9/00* (2022.01)
*G06T 7/11* (2017.01)
(Continued)

(52) U.S. Cl.
CPC .............. *G06T 7/11* (2017.01); *G06K 9/6267* (2013.01); *G06N 3/08* (2013.01); *G06T 7/194* (2017.01); *G06T 13/00* (2013.01)

(58) Field of Classification Search
CPC ......... G06T 15/00; G06T 13/00; G06T 13/40; G06T 19/00; G06T 17/00; G06T 13/80; G06T 17/20; G06T 15/06; G06T 15/40; G06T 15/60; G06T 7/70; G06T 13/20; G06T 7/20; G06T 19/20; G06T 7/00;
(Continued)

(56) References Cited

U.S. PATENT DOCUMENTS 9,177,225 B1 * 11/2015 Cordova-Diba ....... G06V 10/42
9,519,997 B1 * 12/2016 Ryu ...................... G06T 13/20
(Continued)

FOREIGN PATENT DOCUMENTS

JP         6209069    * 11/2013
JP    2015-103075 A    6/2015
(Continued)

OTHER PUBLICATIONS

International Search Report and Written Opinion (PCT/ISA/210 and PCT/ISA/237), dated Aug. 28, 2020 by International Searching Authority in International Application No. PCT/KR2020/007112.
(Continued)

*Primary Examiner* — Quan M Hua
(74) *Attorney, Agent, or Firm* — Sughrue Mion, PLLC

(57) ABSTRACT

An image generating apparatus includes: a display outputting an image; a memory storing one or more instructions; and a processor. The processor is configured to execute the one or more instructions to detect an object in an image including a plurality of frames, provide a plurality of candidate boundaries for masking the detected object, identify an optimal boundary by assessing the provided plurality of candidate boundaries, and generate a partial moving image with the object moving by using the optimal boundary.

19 Claims, 11 Drawing Sheets

(51) Int. Cl.
*G06N 3/08* (2006.01)
*G06K 9/62* (2022.01)
*G06T 7/194* (2017.01)
*G06T 13/00* (2011.01)

(58) Field of Classification Search
CPC ........... G06T 7/73; G06T 15/20; G06T 15/50;
G06T 1/20; G06T 15/08; G06T 15/10;
G06T 1/00; G06T 11/00; G06T 11/20;
G06T 13/60; G06T 15/30; G06T 5/00;
G06T 9/40; G06K 9/00; G06K 9/46;
G06K 9/62; G06K 9/32; G06K 9/20;
G06K 9/36; G06K 9/52
See application file for complete search history.

(56) References Cited

U.S. PATENT DOCUMENTS

| | | | |
|---|---|---|---|
| 9,576,387 B2 | 2/2017 | Lehtiniemi et al. | |
| 10,631,054 B2 | 4/2020 | Park et al. | |
| 2010/0157069 A1* | 6/2010 | Sakamaki | H04N 9/8227 348/207.2 |
| 2014/0226039 A1 | 8/2014 | Yamamoto et al. | |
| 2014/0233915 A1 | 8/2014 | Middleton et al. | |
| 2015/0104113 A1 | 4/2015 | Ugur et al. | |
| 2015/0138386 A1 | 5/2015 | Yano et al. | |
| 2015/0356840 A1 | 12/2015 | Wang et al. | |
| 2016/0147795 A1* | 5/2016 | Tan | G06F 16/583 707/706 |

FOREIGN PATENT DOCUMENTS

| | | |
|---|---|---|
| KR | 10-2016-0133809 A | 11/2016 |
| KR | 10-1804844 B1 | 12/2017 |
| KR | 10-2018-0047973 A | 5/2018 |

OTHER PUBLICATIONS

Dingding Liu et al., "A Review of Computer Vision Segmentation Algorithms", 2011, pp. 1-29, 29 pages total.
Guha Balakrishnan et al., "Synthesizing Images of Humans in Unseen Poses", Computer Vision Foundation, 2018, pp. 8340-8348, 9 pages total.
Communication dated Mar. 14, 2022 issued by the European Patent Office in European Patent Application No. 20836154.3.
Tae-Hyun Oh et al. Personalized Cinemagraphs using Semantic Understanding and Collaborative Learning, Aug. 9, 2017, XP080952203, 17 pages.

* cited by examiner

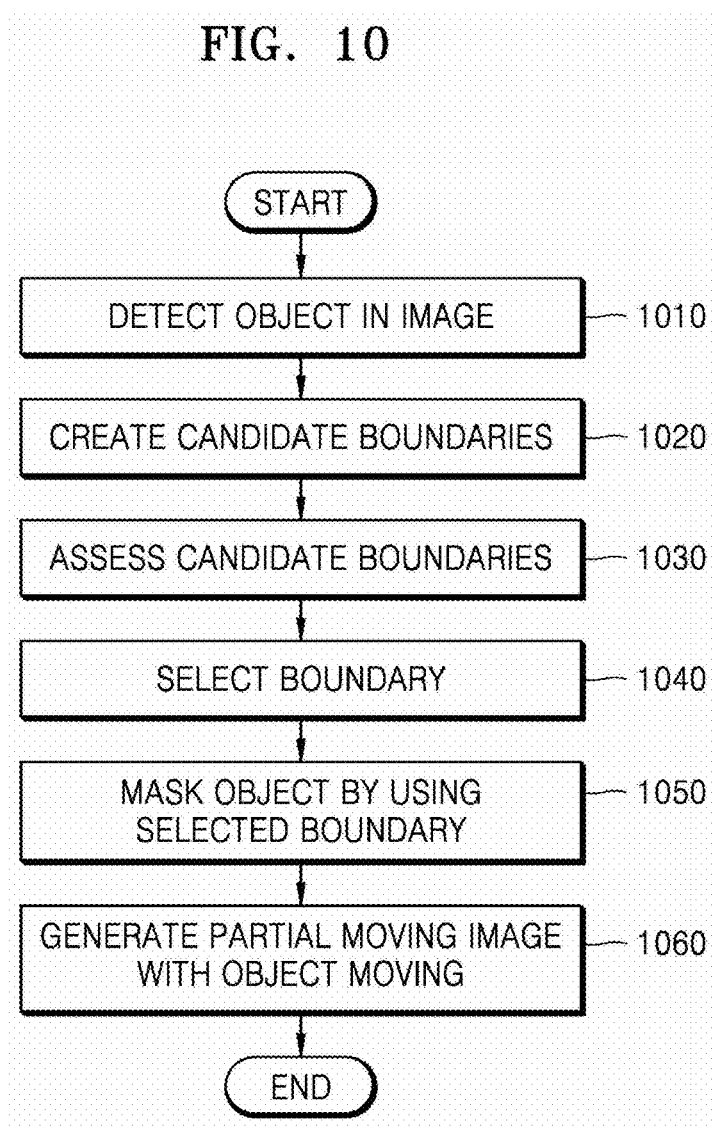

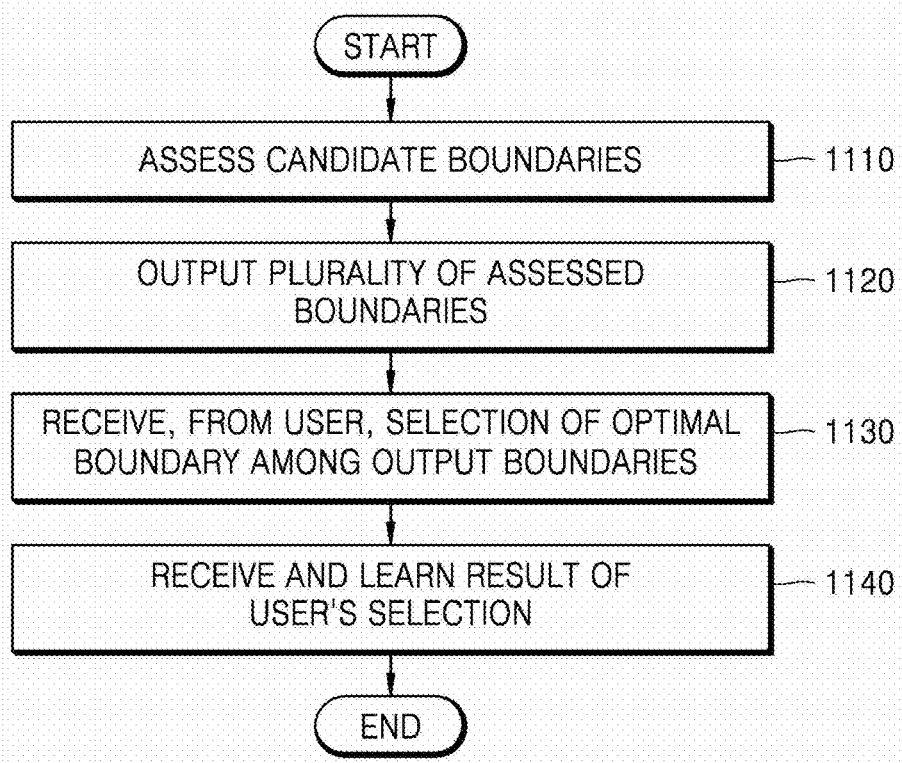

APPARATUS AND METHOD FOR GENERATING IMAGE

CROSS-REFERENCE TO RELATED APPLICATION

This application is based on and claims priority under 35 U.S.C. § 119 to Korean Patent Application No. 10-2019-0083437, filed on Jul. 10, 2019, in the Korean Intellectual Property Office, the disclosure of which is incorporated by reference herein in its entirety.

BACKGROUND

1. Field

The disclosure relates to image generating apparatuses and operation methods thereof, and more particularly, to methods and apparatuses for generating an image with only a part moving in a more natural manner by using an artificial intelligence (AI) model.

2. Description of Related Art

A technique for creating an image with only a particular part moving is being developed. A cinemagraph technique is an example of a technique for creating a graphics interchange format (GIF) file in which only a specific part of an image is moving. The cinemagraph technique is a technique that allows only a particular part of an image to move by extracting a portion of a moving image or a sequence of captured photographs, separating a moving part from a static part in an image, and combining the moving and static parts as a GIF file.

An artificial intelligence (AI) system enables machines to train themselves and make decisions on their own to derive desired results or perform desired operations.

SUMMARY

Provided are a method and apparatus for generating an image with only a part moving in a more natural manner by using an artificial intelligence (AI) model.

Provided are an artificial intelligence (AI) system and an application thereof for simulating functions of a human brain such as cognition and decision-making by using machine learning algorithms such as deep learning.

Additional aspects will be set forth in part in the description which follows and, in part, will be apparent from the description, or may be learned by practice of the presented embodiments.

In accordance with an aspect the disclosure, an image generating apparatus includes: a display outputting an image; a memory storing one or more instructions; and a processor configured to execute the one or more instructions stored in the memory to: detect an object in an image including a plurality of frames; provide a plurality of candidate boundaries for masking the detected object; identify an optimal boundary by assessing the plurality of candidate boundaries; and generate a partial moving image with the object moving by using the optimal boundary.

The processor may be further configured to execute the one or more instructions to: mask the object in one of the plurality of frames by using the identified optimal boundary; and generate the partial moving image with the object moving by using the frame in which the object is masked and the plurality of frames.

The processor may be further configured to execute the one or more instructions to provide the plurality of candidate boundaries for masking the object detected in the image by using a first AI model.

The first AI model may include a plurality of segmentation AI models, and the processor may be further configured to execute the one or more instructions to provide the plurality of candidate boundaries by using the plurality of segmentation AI models.

The processor may be further configured to execute the one or more instructions to assess the plurality of candidate boundaries and obtain a result of the assessing by using a second AI model.

The second AI model may include at least one of an AI model for performing a technical assessment on input data or an AI model for performing an aesthetic assessment on the input data.

The image generating apparatus may further include a user interface, and the display may further output a preset number of boundaries having high ranks from among the plurality of candidate boundaries according to the result of the assessing, which is obtained by using the second AI model, and the processor may be further configured to execute the one or more instructions to identify, as the optimal boundary, a boundary selected by a user via the user interface from among the preset number of boundaries output by the display.

The second AI model may receive and learn information about the user's selection and use a result of the learning when assessing the plurality of candidate boundaries.

The second AI model may learn the information about the user's selection after classifying the information on a per-user basis.

The image generating apparatus may further include a user interface, and the processor may be further configured to execute the one or more instructions to: identify objects that are in motion in the image by tracking the plurality of frames; and detect the object selected by a user via the user interface from among the identified objects.

In accordance with an aspect of the disclosure, an image generating method includes: detecting an object in an image including a plurality of frames; providing a plurality of candidate boundaries for masking the detected object; identifying an optimal boundary by assessing the plurality of candidate boundaries; and generating a partial moving image with the object moving by using the optimal boundary.

In accordance with an aspect of the disclosure, a computer-readable recording medium has recorded thereon a program for implementing an image generating method including: detecting an object in an image including a plurality of frames; providing a plurality of candidate boundaries for masking the detected object; identifying an optimal boundary by assessing the plurality of candidate boundaries; and generating a partial moving image with the object moving by using the identified optimal boundary.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a flowchart of a method of generating a partial moving image, according to an embodiment; and FIG. 11 is a flowchart of a method of assessing a boundary, according to an embodiment.

DETAILED DESCRIPTION

Figure 1:
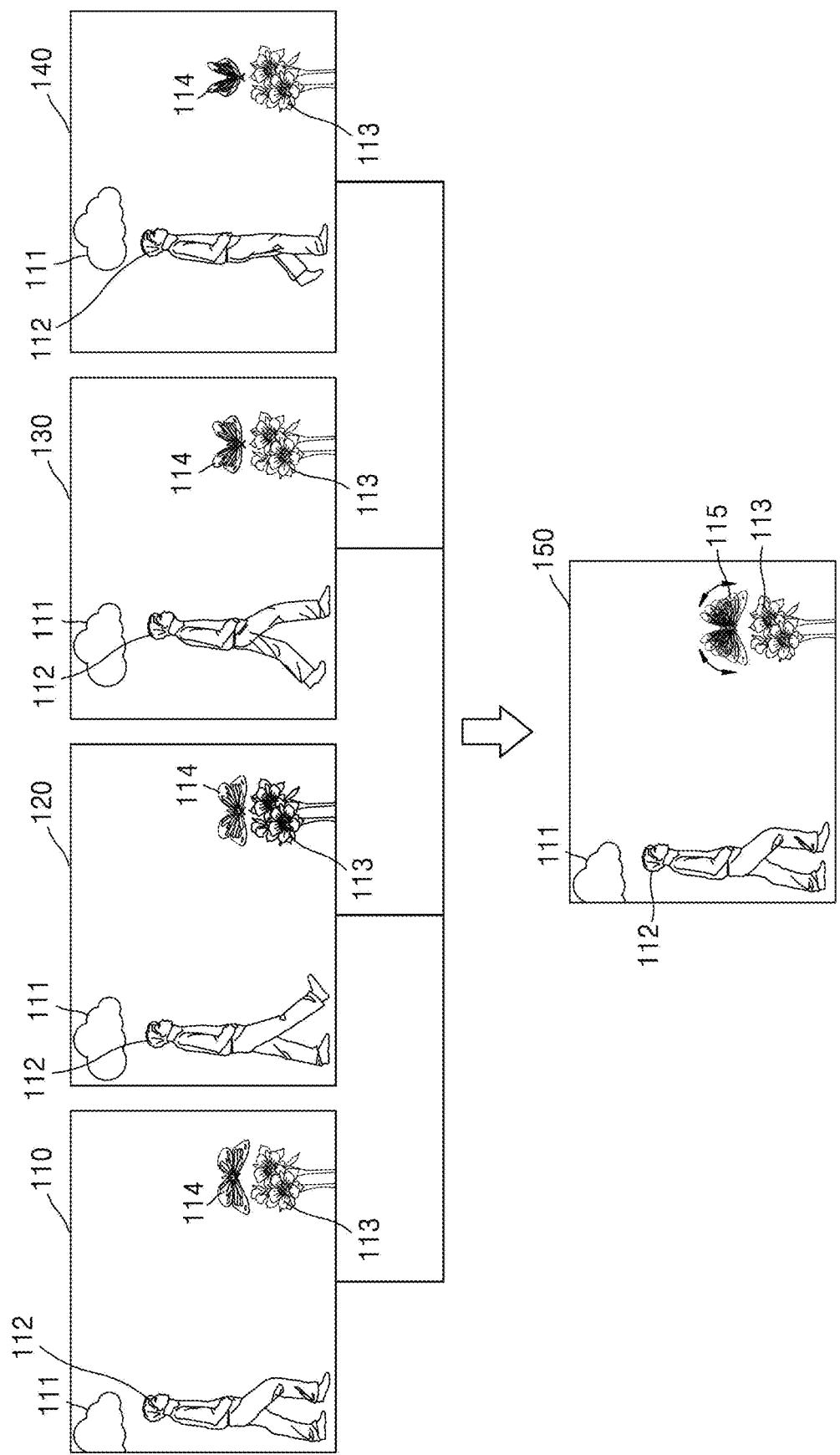
FIG. 1 is a diagram for describing a technique for generating an image with only a part moving, according to an embodiment.

Embodiments of the disclosure will now be described more fully hereinafter with reference to the accompanying drawings so that they may be easily implemented by one of ordinary skill in the art. However, the disclosure may have different forms and should not be construed as being limited to the embodiments set forth herein.

Although the terms used in the disclosure have been described in general terms that are currently used in consideration of the functions referred to in the disclosure, the terms are intended to encompass various other terms depending on the intent of those skilled in the art, precedents, or the emergence of new technology. Accordingly, the terms used in the disclosure should be construed not based on the name of a simple term but based on the meaning of the term and the contents throughout the disclosure.

Furthermore, the terms used herein are used merely for describing a specific embodiment of the disclosure and are not intended to limit the disclosure.

Throughout the specification, it will be understood that when a part is referred to as being "connected" or "coupled" to another part, it can be "directly connected" to or "electrically coupled" to the other part with one or more intervening elements interposed therebetween.

Throughout the specification, in particular, in the claims, "the" or other similar referring expressions may refer to both a singular form and a plural form. Furthermore, operations included in methods according to embodiments may be performed in any suitable order when there is no explicit description of orders of the operations. The disclosure is not limited to the described orders of operations.

Expressions such as "in some embodiments" or "in an embodiment" described in various parts of this specification do not necessarily refer to the same embodiment(s).

The disclosure may be described in terms of functional block components and various processing operations. Some or all of such functional blocks may be implemented by any number of hardware and/or software components that perform specific functions. For example, functional blocks of the disclosure may be implemented by one or more microprocessors or by circuit components for performing certain functions. For example, functional blocks according to embodiments may be implemented with any programming or scripting language. The functional blocks may be implemented using various algorithms executed on one or more processors. Furthermore, the disclosure may employ techniques of the related art for electronics configuration, signal processing and/or data processing. The words "mechanism", "element", "means", and "construction" are used in a broad sense and are not limited to mechanical or physical embodiments.

Furthermore, connecting lines or connectors shown in various figures are intended to represent exemplary functional relationships and/or physical or logical couplings between components in the figures. It should be noted that many alternative or additional functional relationships, physical connections or logical connections may be present in a practical device.

Furthermore, terms such as "portion," "module," etc. used herein indicate a unit for processing at least one function or operation and may be embodied as hardware or software or a combination of hardware and software.

Throughout the disclosure, the expression "at least one of a, b or c" indicates only a, only b, only c, both a and b, both a and c, both b and c, all of a, b, and c, or variations thereof.

Furthermore, in the specification, the term "user" may refer to a person who controls a function or operation of an image generating apparatus by using the image generating apparatus, and include a viewer, a manager, or an installation engineer.

Hereinafter, the disclosure will be described in detail with reference to the accompanying drawings.

FIG. 1 is a diagram for describing a technique for generating an image with only a part moving, according to an embodiment.

Referring to FIG. 1, a plurality of frames 110, 120, 130, and 140 may be continuously captured photographic images. The frames 110, 120, 130, and 140 are captured over time in an order from the leftmost frame, that is, the frame 110, to the rightmost frame, that is, the frame 140. Each of the frames 110, 120, 130, and 140 may include a plurality of subjects. It can be seen in FIG. 1 that a cloud 111, a person 112, flowers 113, and a butterfly 114 are captured together in each of the frames 110, 120, 130, and 140. An object may have the same meaning as a captured subject. According to an embodiment, the object may be a subject having a specifiable shape.

The user may continuously capture an image of a desired subject, i.e., an object. The object may move over time or remain still in the image. For example, as seen on FIG. 1, the cloud 111 moves sequentially from left to right. As seen on FIG. 1, the person 112 is walking from left to right, and the flowers 113 remain stationary regardless of the passage of time. As seen on FIG. 1, the butterfly 114 spreads its wings and then folds them upwards over time.

For convenience of description, an image in which only a specific part of a still image is moving is hereinafter referred to as a partial moving image. To generate a partial moving image, it is necessary to distinguish a static part from a dynamic part in an image. A user may perform a task of separating a layer of a dynamic part from a layer of a static part in an image, or separate a dynamic part from a static part by masking a desired area by using an image editing tool or application. To achieve this, the user may set the dynamic part by using a tool such as a brush tool provided as editing tools. However, for a user who is poor at separating layers or masking a desired area, it may be difficult to generate a partial moving image by creating a natural boundary.

According to an embodiment, an image generating apparatus may automatically determine a boundary for masking an object to be represented as a dynamic part from among objects included in an image, and generate a natural partial moving image by masking the object according to the determined boundary.

It is assumed in FIG. 1 that the user wishes to generate a partial moving image in which only a specific object, such as the butterfly 114, is moving by repeatedly folding and spreading its wings among a plurality of objects included in a still image, while all the other objects, i.e., the cloud 111, the person 112, and the flowers 113, remain stationary.

Referring to FIG. 1, the image generating apparatus may determine an area 115 to display movement of the butterfly 114 and mask the butterfly 114 according to the determined area 115. The area 115 to display the movement of the butterfly 114 may be determined by reflecting a maximum distance by which the butterfly 114 moves in each of the frames 110, 120, 130, and 140. In an embodiment, the image generating apparatus may create a plurality of candidate boundaries for the butterfly 114 selected by the user by using a plurality of segmentation algorithms. According to an embodiment, the image generating apparatus may determine an optimal boundary by assessing the candidate boundaries with an assessment algorithm.

The image generating apparatus may mask the area 115 of the butterfly 114 by using the determined optimal boundary. The image generating apparatus may use one of the frames 110, 120, 130, and 140, e.g., the frame 110, as a still image, mask the area 115 of the butterfly 114 in the still image by using an optimal boundary, and generate a partial moving image with the butterfly 114 moving by using the still image together with the frames 110, 120, 130, and 140. Reference numeral 150 in FIG. 1 denotes a partial moving image generated according to an embodiment. Only the area 115 of the butterfly 114 in the partial moving image 150 is different from that in the still image that is the frame 110, while all the other areas in the partial moving image 150 are the same as those in the still image. As seen in FIG. 1, the butterfly 114 included in the partial moving image 150 is flapping its wings up and down by folding and spreading them.

Figure 2:
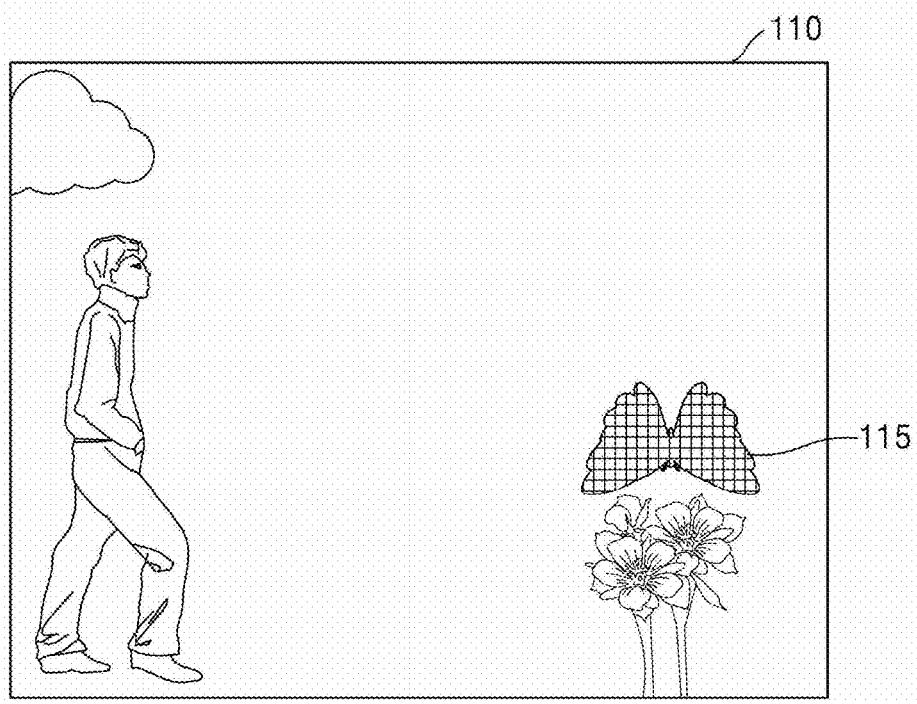
FIG. 2 illustrates an example in which an image generating apparatus masks an object to be represented as a moving part, according to an embodiment.

FIG. 2 illustrates an example in which an image generating apparatus masks an object to be represented as a moving part, according to an embodiment. Referring to FIG. 2, as described with reference to FIG. 1, an image generating apparatus may mask a butterfly, which is an object selected by a user.

In FIG. 2, the image generating apparatus may determine one frame 110 to be used as a still image from among the frames 110, 120, 130, and 140 shown in FIG. 1, and process the area 115 showing movement of the butterfly in the frame 110 to be used as the still image as a mosaic. The image generating apparatus may determine the area 115 showing the movement of the butterfly as the area 115 to be masked, and processes the area 115 to be masked as a mosaic to show it to the user so that the user may identify where the area 115 being masked is. While FIG. 2 shows that the area 115 showing the movement of the butterfly is entirely processed as a mosaic and then masked, this is merely an embodiment of the disclosure, and the image generating apparatus may also indicate a boundary of the area 115 being masked by displaying only a border of an object selected by the user as a thick solid line, a thin solid line, or a dashed line.

The image generating apparatus may create a boundary for the area 115 being masked by using a segmentation algorithm. The image generating apparatus may create a plurality of candidate boundaries by using a plurality of segmentation algorithms.

The image generating apparatus may assess the created candidate boundaries by using one or a plurality of assessment algorithms. The image generating apparatus may determine an optimal boundary based on an assessment result and generate a natural partial moving image by using the determined optimal boundary. The image generating apparatus may cut out the area 115, which is masked, from the frame 110 and allow the frames 110, 120, 130, and 140 to be consecutively visible underneath a frame where the area 115, which is masked, is cut out, thereby generating a partial moving image in which only the butterfly 114 is moving in a still image.

Figure 3:
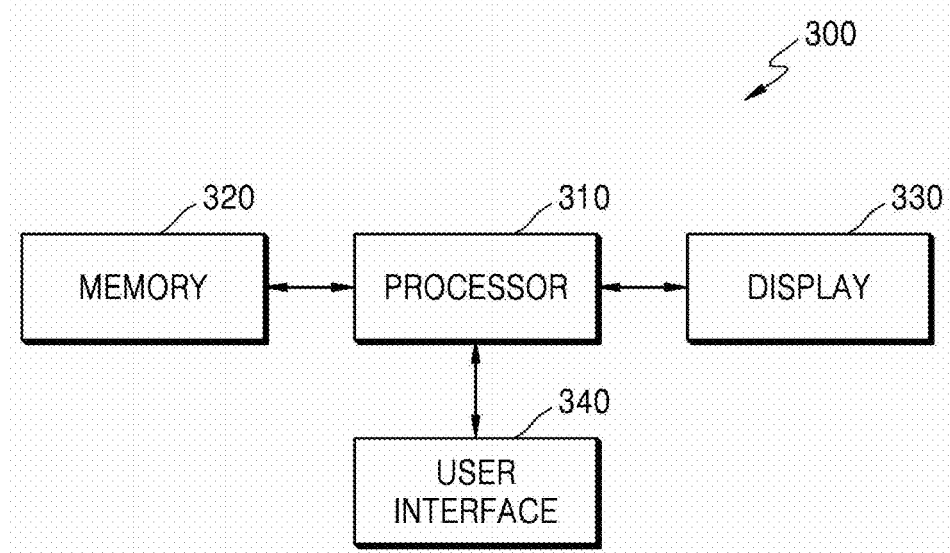
FIG. 3 is an internal block diagram of an image generating apparatus according to an embodiment.

FIG. 3 is an internal block diagram of an image generating apparatus 300 according to an embodiment. Referring to FIG. 3, the image generating apparatus 300 may include a processor 310, a memory 320, a display 330, and a user interface 340.

In an embodiment, the image generating apparatus 300 may be implemented as various electronic devices capable of generating partial images. The image generating apparatus 300 may be a fixed or mobile apparatus. For example, the image generating apparatus 300 may include at least one of a desktop computer, a digital TV, a smartphone, a tablet personal computer (PC), a mobile phone, a video phone, an e-book reader, a laptop PC, a netbook computer, a digital camera, a personal digital assistant (PDA), a portable multimedia player (PMP), a camcorder, a navigation device, a wearable device, or a smart watch.

The processor 310 controls all operations of the image generating apparatus 300. The processor 310 may execute one or more instructions stored in the memory 320 to control the image generating apparatus 300 to function.

In an embodiment, the processor 310 may execute one or more instructions to detect an object in an image including a plurality of frames, create a plurality of candidate boundaries for masking the detected object, determine an optimal boundary by assessing the candidate boundaries, and generate a partial moving image with an object moving by using the optimal boundary.

According to an embodiment, the processor 310 may mask the object in one of the plurality of frames by using the optimal boundary and generate a partial moving image with the object moving by using the frame in which the object is masked and the plurality of frames.

According to an embodiment, the processor 310 may determine an optimal boundary in an image included in a plurality of frames and mask an object by using the optimal boundary, thereby generating a partial moving image that appears natural and aesthetically excellent.

According to an embodiment, the processor 310 may extract a plurality of objects from an image. An area that a user desires to keep still and an area that the user desires to create as a dynamic area in the partial moving image may be different depending on users. Thus, when there are a plurality of objects in the image, the processor 310 may extract the objects from the image and output them to the user via the display 330. The user may select an object that the user desires to create as a dynamic area via the user interface 340.

According to an embodiment, the processor 310 may track a plurality of frames to extract only an object that is in motion from the image.

In an embodiment, the image generating apparatus 300 may use artificial intelligence (AI) technology. AI technology may consist of machine learning (deep learning) and element technologies using the machine learning. AI technology may be implemented using algorithms. In this case, an algorithm or a set of algorithms for implementing AI technology are called a neural network. Here, the neural network may receive input data, perform computations for analysis and classification, and output resultant data. In order for the neural network to accurately output the resultant data corresponding to the input data in this way, training the neural network is needed. In this case, 'training' may involve inputting various pieces of data to the neural network and teaching the neural network to discover or learn by itself a method of analyzing the pieces of input data, a method of classifying the pieces of input data, and/or a method of extracting features necessary for generating resultant data from the pieces of input data. Training a neural network means that an AI model with desired characteristics is created by applying a learning algorithm to a large number of training data. The training may be performed in the image generating apparatus 300 itself in which AI is performed according to an embodiment, or may be performed via a separate server/system.

Here, the learning algorithm is a method by which a particular target device (e.g., a robot) is trained with a large number of training data to make decisions or predictions on its own. Examples of the learning algorithm may include supervised learning, unsupervised learning, semi-supervised learning, and reinforcement learning, but the learning algorithm according to an embodiment is not limited to the above-described examples except as specified herein.

A set of algorithms that output data corresponding to input data through a neural network, software for executing the set of algorithms, and/or hardware for executing the set of algorithms may be referred to as an 'AI model'.

The processor 310 may process input data according to predefined operation rules or an AI model stored in the memory 320. The predefined operation rules or AI model may be created by using a specific algorithm. Furthermore, the AI model may be created by learning a specific algorithm.

The processor 310 may generate output data corresponding to input data by using the AI model. According to an embodiment, the processor 310 may generate final output data from input data by using a plurality of AI models.

The processor 310 may provide a plurality of candidate boundaries for masking an object detected in an image by using a first AI model. The first AI model may be an algorithm or a set of algorithms for segmenting and separating a specific object from input data, software for executing the set of algorithms, and/or hardware for executing the set of algorithms.

The first AI model may include a plurality of segmentation AI models. The segmentation AI models may be AI models that separate objects from an image, and may output different results even when given the same input data according to algorithms.

In an embodiment, the segmentation AI models may respectively create a plurality of boundaries for masking an object included in an input image.

In an embodiment, the processor 310 may assess the created candidate boundaries by using a second AI model. The second AI model may be an algorithm or a set of algorithms for assessing input data, software for executing the set of algorithms, and/or hardware for executing the set of algorithms.

The algorithm for assessing the input data may be an algorithm that performs a technical assessment on the input data or an algorithm that performs an aesthetic assessment on the input data. According to an embodiment, the second AI model may include at least one of an AI model for performing the technical assessment or an AI model performing the aesthetic assessment.

The processor 310 may identify a technically and/or aesthetically excellent boundary from among the candidate boundaries by using the second AI model.

The display 330 may output an excellent boundary identified by the processor 310 on a screen. When there are a plurality of excellent boundaries identified by the processor 310, the display 330 may output the excellent boundaries. According to an embodiment, the display 330 may sequentially output boundaries in a descending order of an assessment score from among the candidate boundaries.

The user may select one of the boundaries output on the display 330 via the user interface 340.

According to an embodiment, when the user selects a boundary, the second AI model may receive and learn information about a user's selection. The second AI model may predict the user's tastes or preferences by learning information selected by the user and reflect the user's preferences when assessing input data in the future.

In an embodiment, when there are users, the second AI model may receive and learn information selected by each user on a per-user basis. The second AI model may identify information selected by each user and reflect each user's preferences learned on a per-user basis when assessing input data in the future.

In detail, the processor 310 may obtain assessment results optimized for each user by learning preferences for each user and reflecting them during future assessment via the second AI model.

According to an embodiment, the memory 320 may store at least one instruction. The memory 320 may store at least one program executed by the processor 310. Furthermore, the memory 320 may store data input to or output from the image generating apparatus 300.

In an embodiment, the memory 320 may store at least one of the above-described AI models. In other words, the memory 320 may store at least one of the first AI model or the second AI model. The memory 320 may store a plurality of segmentation AI models included in the first AI model. When the second AI model includes a plurality of assessment AI models, the memory 320 may store the assessment AI models.

The memory 320 may include at least one of types of storage media, i.e., a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, or an optical disc.

In an embodiment, the processor 310 may have an internal memory therein. The processor 310 may store one or more instructions in the internal memory provided therein and execute the one or more instructions stored in the internal memory to perform the above-described operations. In other words, the processor 310 may perform a specific operation by executing at least one instruction or program stored in the internal memory provided therein or the memory 320.

According to an embodiment, the display 330 may output content via a panel. The content is a media signal and may include a video signal, a text signal, etc. The display 330 may output an image corresponding to the video signal through the panel so that the user may visually recognize the video signal. The video signal may include a moving image, a still image, or a partial moving image in which only a part of the still image is moving.

According to an embodiment, the display 330 may sequentially output a plurality of frames included in an image. In an embodiment, an image may be a captured moving image, an animation generated for continuous playback, or the like.

In an embodiment, when the processor 310 detects an object in an image, the display 330 may output a detection result. For example, the display 330 may identify the object, e.g., by displaying a boundary of the detected object as a line or the like and show the identified object to the user. The user may identify an object included in an image via the display 330.

In an embodiment, the display 330 may output a user interface screen including output data generated by the processor 310 with an AI model. For example, the processor 310 may assess a plurality of candidate boundaries by using the second AI model, and the display 330 may output boundaries having high assessment scores to the user. The display 330 may output the boundaries in a descending order of an assessment score, or output each boundary together with information indicating an assessment score or ranking of the boundary. The display 330 may generate and output an interface screen that allows the user to select a preferred boundary from among the output boundaries.

The display 330 may output, on the screen, a partial moving image generated using a final determined optimal boundary.

When the display 330 is implemented as a touch screen, the display 330 may be used as an input device as well as an output device. For example, the display 330 may include at least one of a liquid crystal display (LCD), a thin-film transistor LCD (TFT-LCD), an organic light-emitting diode (OLED) display, a flexible display, a three-dimensional (3D) display, or an electrophoretic display. In addition, the image generating apparatus 300 may include two or more displays 330 according to its implemented configuration.

The user interface 340 may receive a user input for controlling the image generating apparatus 300. The user interface 340 may include, but is not limited to, various types of user input devices including a touch panel for sensing a user's touch, a button for receiving a user's push operation, a wheel for receiving a user's rotation operation, a keyboard, a dome switch, a microphone for voice recognition, a motion detector for sensing motion, etc. Furthermore, when the image generating apparatus 300 is operated by a remote controller, the user interface 340 may receive a control signal from the remote controller.

The user may select, via the user interface 340, a desired object from among a plurality of objects detected in an image. In addition, when a preset number of boundaries with high ranks from among a plurality of candidate boundaries provided by the processor 310 are output via the display 330, the user may select a preferred boundary via the user interface 340.

Figure 4:
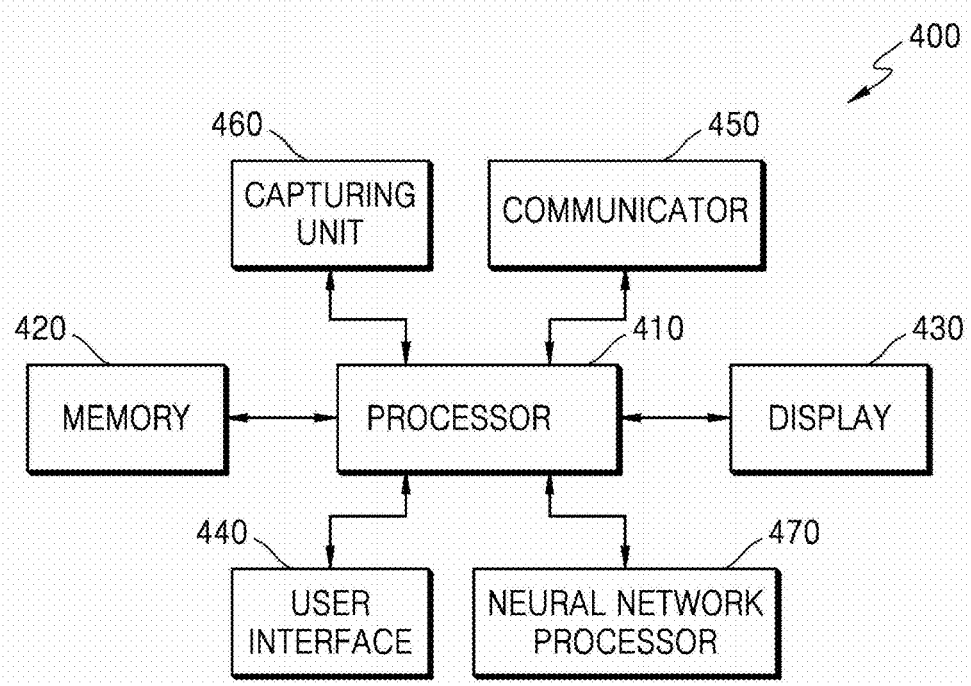
FIG. 4 is an internal block diagram of an image generating apparatus according to an embodiment.

FIG. 4 is an internal block diagram of an image generating apparatus 400 according to an embodiment. Referring to FIG. 4, the image generating apparatus 400 may include the image generating apparatus 300 of FIG. 3. Descriptions that are already provided above with respect to FIG. 3 will be omitted below.

The image generating apparatus 400 may include a processor 410, a memory 420, a display 430, and a user interface 440. The image generating apparatus 400 may further include a communicator 450, a capturing unit 460, and a neural network processor 470 in comparison to the image generating apparatus 300 of FIG. 3.

The communicator 450 may communicate with external devices via wired and wireless networks. In detail, the communicator 450 may exchange signals with an external device connected via a wired or wireless network according to control by a processor 410. The external device may be a content supply server, a broadcasting station server or an electronic device that supplies content output via a display 430, or an information storage medium such as a universal serial bus (USB) storage medium. Furthermore, the external device may include a server, a server system, and a server-based device that process data exchanged with the communicator 450.

The communicator 450 may include at least one communication module such as a short-range communication module, a wired communication module, a mobile communication module, and a broadcast reception module. A communication module may include a tuner for performing broadcasting reception and a communication module capable of performing data transmission and reception via a network that conforms to communication standards such as Bluetooth, wireless local area network (WLAN), wireless fidelity (Wi-Fi), wireless broadband (Wibro), World Interoperability for Microwave Access (Wimax), code division multiple access (CDMA), wide-band CDMA (WCDMA), etc.

According to an embodiment, the communicator 450 may receive an image including a plurality of frames from an external device. In an embodiment, the communicator 450 may receive, from an external device, various instructions, an algorithm used by the processor 410, an AI model implemented with algorithms, etc. The communicator 450 may transmit a partial moving image generated by the processor 410 to an external device.

The capturing unit 460 may generate an image by capturing an image of a subject, i.e., an object, and perform signal processing on the image. According to an embodiment, the capturing unit 460 may include a camera. The user may obtain an image including a plurality of frames by capturing an image of a subject to be photographed for a specific time via the capturing unit 460. According to an embodiment, there may be a plurality of subjects. According to an embodiment, the subject included in the frames may be a subject with movement over time.

The camera may allow information about the subject to be imaged on an image sensor such as a charge-coupled device (CCD) or complementary metal oxide semiconductor (CMOS) sensor, and convert light received via the camera into an electrical signal. The capturing unit 460 may perform at least one signal processing on the captured image from among auto exposure (AE), auto white balance (AWB), color recovery, correction, sharpening, gamma, and lens shading correction.

The image generating apparatus 400 of FIG. 4 may further include the neural network processor 470 in comparison with the image generating apparatus 300 of FIG. 3. In other words, unlike the image generating apparatus 300 of FIG. 3, the image generating apparatus 400 of FIG. 4 may use the neural network processor 470 that is separate from the processor 410 to perform computations via a neural network.

The neural network processor 470 may execute one or more instructions to perform the computations via the neural network.

In detail, the neural network processor 470 may provide a plurality of candidate boundaries for masking an object detected in an image including a plurality of frames by performing computations via the neural network and identify an optimal boundary by assessing the provided candidate boundaries.

The processor 410 or the neural network processor 470 may then mask the object in one of the plurality of frames by using the identified optimal boundary and generate a partial moving image in which the object is in motion by using a frame where the object is masked and the frames.

The neural network processor 470 may provide a plurality of candidate boundaries for masking an object detected in an image by using a first AI model. The first AI model may include a plurality of segmentation AI models. The neural network processor 470 may provide a plurality of candidate boundaries by using the segmentation AI models.

The neural network processor 470 may obtain an assessment result by assessing the candidate boundaries with a second AI model. The second AI model may include at least one of an AI model for performing a technical assessment on input data or an AI model for performing aesthetic assessment thereon.

The display 430 may output a preset number of boundaries having high ranks from among a plurality of candidate boundaries, and the user interface 440 may receive, from a user, a selection of one of the preset number of boundaries displayed on the display 430.

The neural network processor 470 may identify the boundary selected by the user as an optimal boundary. The neural network processor 470 may receive and learn information about the user's selection by using the second AI model and use a learning result when assessing candidate boundaries. The neural network processor 470 may receive and learn information about a user's selection for each of a plurality of users by using the fact that each user selects a specific boundary, and classify learning results according to the users for future use. When a specific user requests assessment of candidate boundaries in the future, the neural network processor 470 may provide an assessment result that is more likely to be preferred by the specific user by reflecting the user's tastes classified on a per-user basis.

According to an embodiment, the neural network processor 470 may not be included in the image generating apparatus 400 but may be included in an external device capable of transmitting or receiving signals via the communicator 450. In this case, when the image generating apparatus 400 requests, via the communicator 450, the external device to determine an optimal boundary for an object detected in an image, the external device may transmit information about an optimal boundary determined using an AI model to the image generating apparatus 400, and the image generating apparatus 400 may generate a partial moving image based on a determination result.

Figure 5:
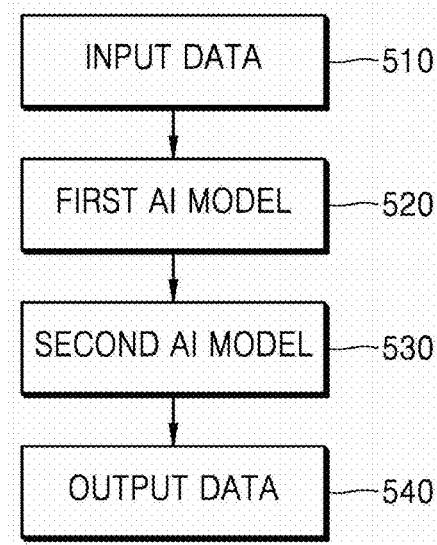
FIG. 5 illustrates a process by which an artificial intelligence (AI) model generates output data by processing input data, according to an embodiment.

FIG. 5 illustrates a process by which an AI model generates output data by processing input data, according to an embodiment.

In an embodiment, the AI model may be a neural network itself including at least one layer operating to receive input data and output desired results. Furthermore, according to an embodiment, the AI model may refer to an algorithm or a set of a plurality of algorithms for performing computations via a neural network and outputting a desired result, a processor for executing the algorithm or set of algorithms, software for executing the algorithm or set of algorithms, or hardware for executing the algorithm or set of algorithms.

Referring to FIG. 5, in an embodiment, the AI model may include a first AI model 520 and a second AI model 530. The first AI model 520 and/or the second AI model 530 may be composed of a plurality of neural network layers. Each of the neural network layers has a plurality of weight values and may perform computations for a layer via calculations between a result of computations in a previous layer and a plurality of weight values.

According to an embodiment, a network of neurons, i.e., a neural network, constituting the first AI model 520 may be a set of algorithms that learn a method of generating a boundary for segmenting an object from an image input to the neural network.

In an embodiment, a neural network constituting the second AI model 530 may be a set of algorithms that learn a method of assessing a plurality of candidate boundary groups input to the neural network based on AI technology. The neural network constituting the second AI model 530 may learn a method of assessing a boundary based on supervised learning using an image or boundary to be assessed as an input value and/or on unsupervised learning that finds a pattern or method for assessing an image or boundaries by autonomously learning the type of data necessary for assessing the image or boundaries without guidance.

In an embodiment, the neural network constituting the second AI model 530 may learn a method of assessing a boundary based on reinforcement learning using feedback with respect to a result of recognizing the boundary according to learning. As another example, the neural network may learn a method of assessing a boundary by using semi-supervised learning.

According to an embodiment, the first AI model 520 may receive input data 510, perform computations on the input data 510 via the neural network, and output a result corresponding to the input data 510. In an embodiment, the input data 510 may be an image including an object. The first AI model 520 may create a boundary for segmenting an object desired by the user among a plurality of objects included in an image composed of a plurality of frames.

Segmentation may mean separating an object from an image. Segmentation is the process of partitioning a digital image into multiple sets of pixels and may mean simplifying or transforming an image in a manner that is more meaningful allows easier analysis.

In an embodiment, the first AI model 520 may detect a contour of an object by finding a border of the object, such as a line or curve, in an image. The first AI model 520 may create a boundary representing the contour of the object. The boundary created according to the first AI model 520 may have different types and shapes. In addition, even when the same first AI model 520 is used, created boundaries may vary according to the input data 510.

The second AI model 530 may receive an output value of the first AI model 520, perform computations on the output value via the neural network, and yield output data 540. The second AI model 530 may receive various boundaries, which are output values of the first AI model 520, assess the received boundaries to find an optimal boundary to be used for segmenting an object in an image, and output the optimal boundary as the output data 540.

Figure 6:
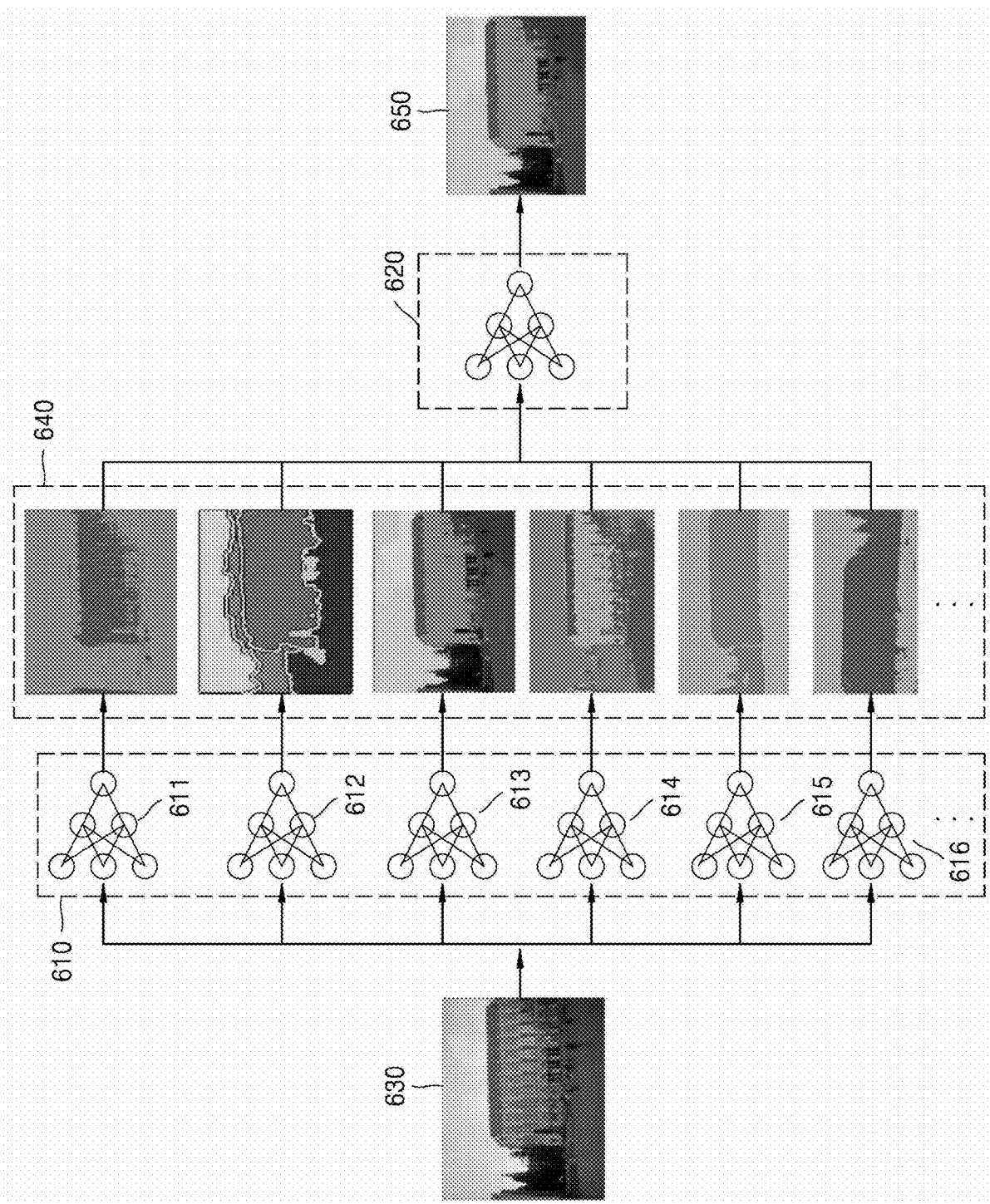
FIG. 6 is a diagram for describing a process of determining an optimal boundary for an object by processing input data with an AI model, according to an embodiment.

FIG. 6 is a diagram for describing a process of determining an optimal boundary for an object by processing input data with an AI model, according to an embodiment.

Referring to FIG. 6, input data 630 may be an image. In detail, the input data 630 may be an image including an object to be segmented. In an embodiment, the object to be segmented may be an object with movement.

In an embodiment, the object shown in FIG. 6 may be a building included in the image. For example, it is assumed that the image shown in FIG. 6 is an image captured when the building is shaking due to an earthquake. It is also assumed that a user desires to generate a partial moving image in which only the building is shaking while parts other than the building are stationary.

The user may directly identify the object included in the input data 630 and notify the image generating apparatus 300 about the object. Alternatively, the image generating apparatus 300 may track a motion in the input image, identify the building that is the object in motion, and output the moving building on a screen to the user. When the ground as well as the building shakes and people moves, the image generating apparatus 300 may track a motion in the image to display the ground or people with the tracked motion as an object on the screen to the user.

The user may select the building that is the desired object from among the objects to distinguish an area to be displayed as a static part from an area to be displayed as a dynamic part in a partial moving image.

By using an AI model, the image generating apparatus 300 may receive the input data 630, perform computations on the input data 630 via a neural network, and yield output data 650. In an embodiment, the AI model may include a first AI model 610 and a second AI model 620.

According to an embodiment, the neural network used in the AI model may be a deep neural network (DNN) that performs computations via a plurality of hidden layers. When the neural network includes a plurality of hidden layers which are interior layers for performing computations, i.e., when a depth of the neural network where computations occur increases, the neural network may be classified as a DNN.

Examples of a neural network may include a convolutional neural network (CNN), a DNN, a recurrent neural network (RNN), a restricted Boltzmann machine (RBM), a deep belief network (DBN), a bidirectional recurrent DNN (BRDNN), and a deep Q-network (DQN), but the neural network according to an embodiment is not limited thereto except as specified herein. Furthermore, the CNN may be subdivided into a deep CNN (DCNN), a capsule neural network (Capsnet), or the like.

According to an embodiment, the image generating apparatus 300 may create a plurality of boundaries for an object by processing the input data 630 with the first AI model 610. Each of the boundaries output from the first AI model 610 may be a contour for distinguishing the corresponding object from the other parts in the image. Based on differences between the object included in the image and the rest of the image in color, saturation, brightness, contrast, etc., the first AI model 610 may create a plurality of boundaries for segmenting the object according to various characteristics such as a sharpness of a contour for separating the object, a type of the contour, a thickness of the contour, a size of texture, etc.

Techniques for segmenting an object in an image may be largely categorized into pixel-based, edge-based, and region-based methods. A thresholding method that is one of pixel-based segmentation algorithms segments an object by selecting a specific threshold and displaying a pixel having a value less than the threshold as a black pixel and a pixel having a value greater than or equal to the threshold as a white pixel. The thresholding method is mostly used to extract a border of an image or binarize the image.

An edge-based segmentation algorithm may be an algorithm composed of a process of finding pixels having a sharp intensity difference, corresponding to an edge in an image, and connecting the found pixels. Because the edge-based segmentation algorithm detects not only meaningful edges required for segmentation but also all the other edges in the image, this algorithm involves a post-processing operation of selecting only the meaningful edges therein. A post-processing operation may include a process of detecting only a meaningful region in an image by using thinning, linking, Hough transform, or various other algorithms. Examples of commonly used edge-based segmentation algorithms may include a Canny edge detection method, a Susan edge detection method, etc.

A region-based segmentation technique is based on parts of an image having similar properties and is a technique for classifying an object by designating parts in the image having similar properties, including color, surface pattern, texture, etc. as well as intensity and gray-level, as the same region. The region-based segmentation technique may be an algorithm that distinguishes a border of a recognizable object from others. In a region-growing algorithm, which is the most commonly used region-based segmentation technique, a reference pixel (seed) is selected for a region and compared with neighboring pixels. Pixels having similar properties to the reference pixel are considered as the same region and added to expand the region. The growth of the region may stop when there is no more neighboring pixels with similar properties to the seed. Other region-based segmentation techniques may be region merging, region splitting, etc.

A watershed segmentation method is a method of splitting an image into regions in a manner similar to concepts used in topography, and various algorithms for implementing the watershed segmentation method are being developed, including a flooding algorithm.

In an embodiment, the first AI model 610 may be implemented using various segmentation algorithms described above. In an embodiment, the first AI model 610 may include a plurality of segmentation AI models 611, 612, 613, 614, 615, and 616. Each of the segmentation AI models 611 through 616 may output a result corresponding to an input by using one or a plurality of neural networks. Each of the neural networks implementing the segmentation AI models 611 through 616 may be an algorithm having specific segmentation characteristics, which is trained to receive the input data 630, perform computations for the above-described analysis and classification, and output a boundary that is more accurate resultant data.

By examining a plurality of candidate boundaries 640 respectively created using the segmentation AI models 611 through 616, it can be seen that the candidate boundaries 640 are all different from one another. For example, some boundaries may be very detailed while others are not, some boundaries may be very thick while others are very thin, etc., The second AI model 620 may receive the candidate boundaries 640 output from the first AI model 610 as input data, perform assessments on the input data, and yield the output data 650. The second AI model 620 may include at least one of a neural network that assesses technical qualities of a plurality of images and/or boundaries or a neural network that has learned aesthetic preferences of a plurality of users with respect to the images or the boundaries.

According to an embodiment, the second AI model 620 may assess technical and/or aesthetic qualities of the candidate boundaries 640 and output a boundary exhibiting the best assessment result as output data 650.

The image generating apparatus 300 may mask an object in a frame by using the boundary output as the output data 650 and generate a partial moving image in which only the object in the boundary is moving by using the frame in which the object is masked and the plurality of frames.

Figure 7:
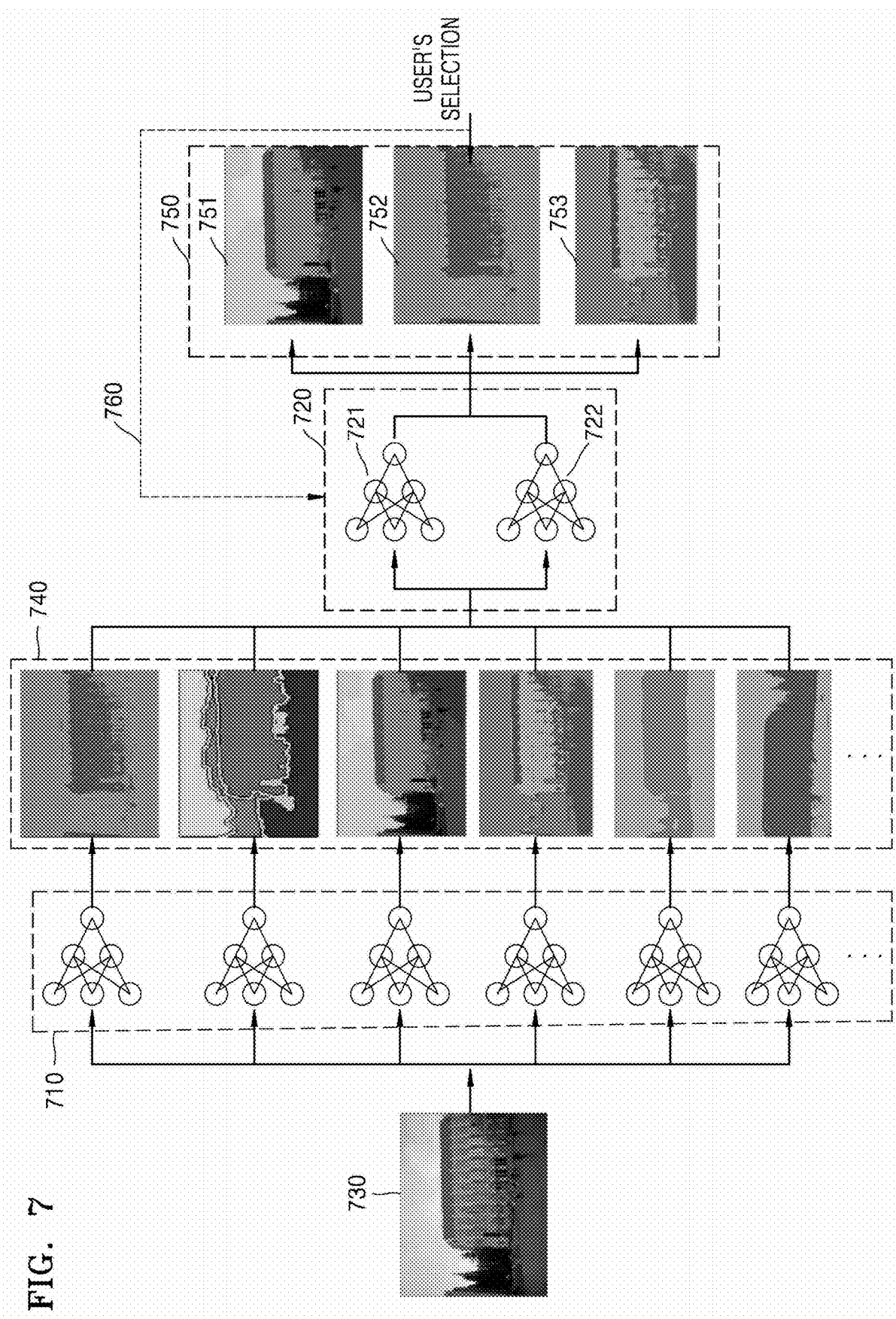
FIG. 7 is diagram for describing a process by which a second AI model receives a user's selection as feedback data and learns the feedback data, according to an embodiment.

FIG. 7 is diagram for describing a process by which a second AI model receives a user's selection as feedback data and learns the feedback data, according to an embodiment.

The embodiment shown in FIG. 7 is similar to the embodiment in FIG. 6, but is different therefrom in that a second AI model 720 includes a plurality of algorithms and that one of a plurality of pieces of output data 750 is selected by a user and the second AI model 720 learns a result of the user's selection. Descriptions that are already provided above with respect to FIG. 6 will be omitted below.

Referring to FIG. 7, by using an AI model, the image generating apparatus 300 may receive input data 730, perform computations on the input data 730 via a neural network, and output the pieces of output data 750. According to an embodiment, the AI model may include a first AI model 710 and the second AI model 720.

In an embodiment, the image generating apparatus 300 may create a plurality of candidate boundaries 740 for an object by processing the input data 730 with the first AI model 710.

In an embodiment, the second AI model 720 may be a model for assessing input data. In an embodiment, the second AI model 720 may include an AI model 721 that assesses a technical quality of an image or boundary and an AI model 722 that assesses an aesthetic quality of the image or boundary.

The AI model 721, which assesses the technical quality of an image or boundary, may be an AI model implemented as an algorithm for assessing the presence of pixel-level image quality degradations in an image or boundary, such as an error rate on an original version, noise, blur (resolution), compression artifacts, etc. Examples of algorithms for assessing the technical quality of an image or boundary may include peak signal-to-noise ratio (PSNR), mean squared error (MSE), and structural similarity (SSIM), etc.

PSNR indicates a ratio between a maximum possible value of a signal and noise and is mainly used to assess image quality loss information in lossy image or video compression. MSE indicates a mean squared error, i.e., a measurement value for a difference between pixel values in two images, the difference being calculated by comparing an original image with a resulting image obtained after certain image processing on the original image. Root MSE (RMSE) is the square root of MSE and may be used as a standard deviation in statistics. SSIM represents SSIM index that is a method for measuring similarity between an original image and distortions caused by compression and transformation.

The AI model 721 for assessing the technical quality of an image or boundary is not limited to the implementation of the above-described techniques, and may also be implemented as an algorithm using various types of technical assessment methods that are to be developed in the future.

The AI model 722 for assessing the aesthetic quality of an image or boundary may be an algorithm generated by learning a result of assessment of an aesthetic quality of the image or boundary by persons who view it. For example, the AI model 722 may be neural image assessment (NIMA) or the like. Aesthetic assessment for an image or boundary is a technique for dealing with semantic level characteristics related to emotion and beauty in the image or boundary, and this algorithm may be a technique that enables prediction of quality by ranking a result of assessment for the image or boundary with a rating or the like and predicting a distribution of ratings.

NIMA is a DCNN trained to predict which images a typical user would rate as good or aesthetically attractive, and may be a neural network capable of scoring images stably and with a high correlation with human perception. A NIMA model may be an algorithm using a method that involves obtaining a distribution of ratings for an input image or boundary, calculating a likelihood for each possible score, and aesthetically ranking images by using various functions (e.g., a mean) of a NIMA vector score.

According to an embodiment, the AI model 722 for assessing an aesthetic quality is not limited to the above-described NIMA model, and may be any of various types of aesthetic assessment algorithms that are to be developed in the future.

In an embodiment, by using the AI model 721 for assessing the technical quality of the image or boundary and the AI model 722 for assessing the aesthetic quality of the image or boundary, the second AI model 720 may assess and learn both the technical and aesthetic qualities of a plurality of images or boundaries. When an arbitrary boundary is input after the learnings is completed, the second AI model 720 may output, as the pieces of output data 750, boundaries with high assessment scores, which are more likely to be preferred by users based on a result of the learning. As shown in FIG. 7, the second AI model 720 may output three boundaries 751, 752, and 753 having high assessment scores and receive a selection of a boundary desired by the user from among the three boundaries 751, 752, and 753. The user may select a desired boundary 752 from among the three boundaries 751, 752, and 753 output as the pieces of output data 750.

According to an embodiment, the second AI model 720 may receive a user's preferred style as feedback data 760 by using information about the user's selection. The second AI model 720 may receive and learn the feedback data 760. The second AI model 720 may output three boundaries closer to the user's preferred style in a next assessment.

Figure 8:
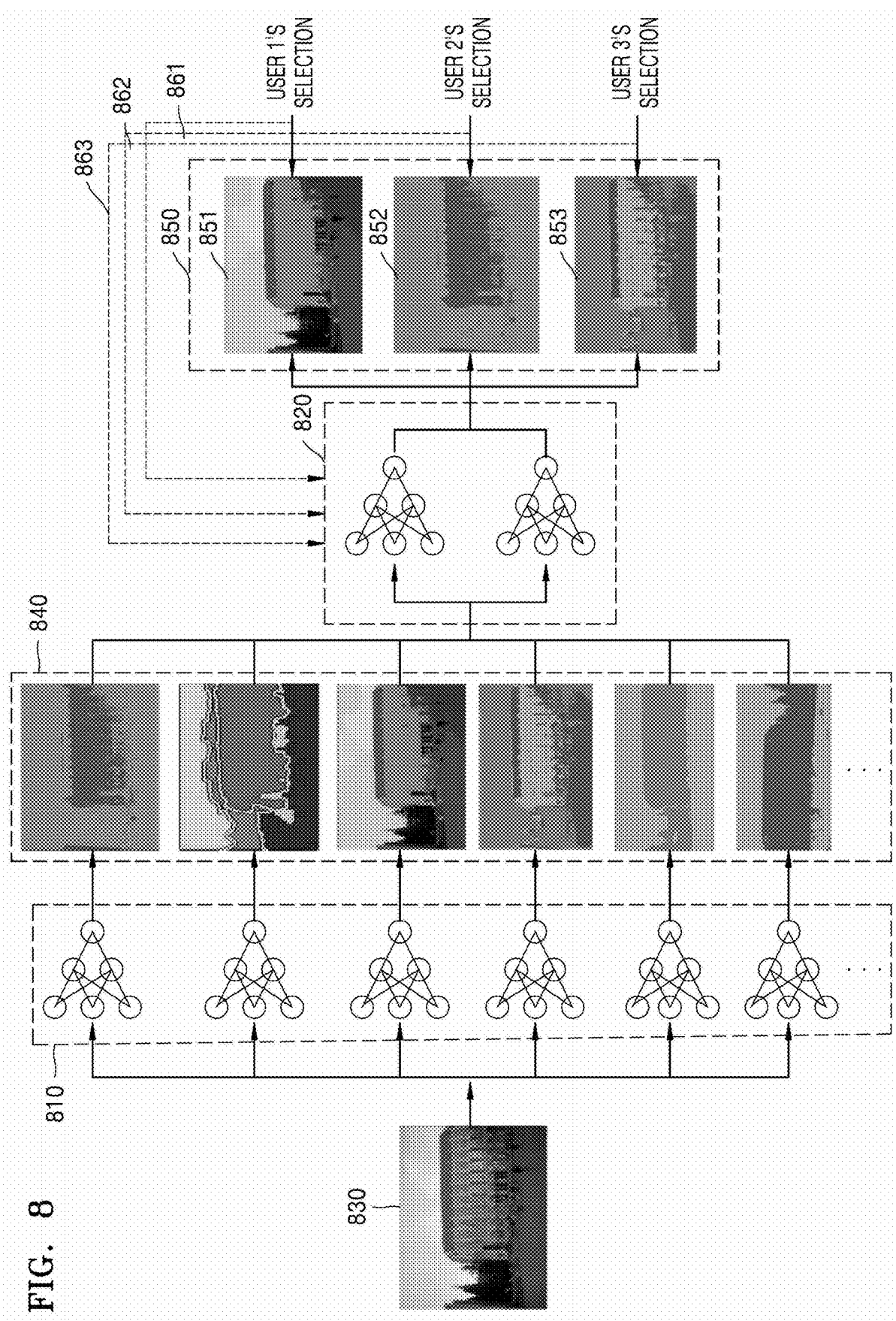
FIG. 8 is a diagram for describing a process by which a second AI model receives selections by a plurality of users as feedback data and uses the feedback data, according to an embodiment.

FIG. 8 is a diagram for describing a process by which a second AI model receives selections by a plurality of users as feedback data and uses the feedback data for a next assessment, according to an embodiment.

The embodiment shown in FIG. 8 is similar to those described with reference to FIGS. 6 and 7. However, the embodiment in FIG. 8 is different from the embodiment described with reference to FIG. 7 in that a second AI model 820 receives selections of a plurality of pieces of output data 850 from a plurality of users and learns results of the selections. Descriptions that are already provided above with respect to FIGS. 6 and 7 will be omitted below.

Referring to FIG. 8, by using an AI model, the image generating apparatus 300 may receive input data 830, perform computations on the input data 830 via a neural network, and output the pieces of output data 850. According to an embodiment, the AI model may include a first AI model 810 and the second AI model 820.

In an embodiment, the image generating apparatus 300 may create a plurality of candidate boundaries 840 for an object by processing the input data 830 with the first AI model 810.

According to an embodiment, the second AI model 820 may be a model that receives the candidate boundaries 840 as input data and assesses them. According to an embodiment, the second AI model 820 may include at least one of an AI model for assessing a technical quality of an image or boundary or an AI model for assessing the aesthetic quality of the image or boundary. In an embodiment, two assessment AI models included in the second AI model 820 may both be AI models for assessing technical qualities or AI models for assessing aesthetic qualities. For example, when the two AI models included in the second AI model 820 are both AI models for assessing aesthetic qualities, the image generating apparatus 300 may use these AI models to output, for input images or boundaries, images or boundaries perceived as beautiful by the human eye as an assessment result in various ways.

In an embodiment, the second AI model 820 may assess and learn a plurality of images or boundaries by assessing a technical quality and/or an aesthetic quality of input data. When the candidate boundaries 840 are input after the learning is completed, the second AI model 820 outputs, as the pieces of output data 850, boundaries with high assessment scores, which are more likely to be preferred by users based on a result of the learning. Referring to FIG. 8, the second AI model 820 may output three boundaries, i.e., first through third boundaries 851, 852, and 853, having high assessment scores, and may receive a selection of a desired boundary from the user.

In an embodiment, the user may be a plurality of users. For example, when three users, i.e., user 1, user 2, and user 3, generate a partial moving image by using the same image generating apparatus 300, boundaries desired by user 1, user 2, and user 3 may all be the same or different. As shown in FIG. 8, it is assumed that user 1, user 2, and user 3 respectively select the first, second, and third boundaries 851, 852, and 853 from among the pieces of output data 850.

According to an embodiment, the second AI model 820 may receive a style preferred by each user as feedback data.

As shown in FIG. 8, the second AI model 820 may respectively receive pieces of information about selections by user 1, user 2, and user 3 as pieces of feedback data 861, 862, and 863. The second AI model 820 may receive one of the pieces of feedback data 861, 862, and 863 for each user as input data and learn preferences for each user by learning the received piece of feedback data.

In the next assessment, the second AI model 820 may output three boundaries closer to a user's preferred style for each user. For example, when user 1 wishes to select a boundary by using the image generating apparatus 300 next time, the second AI model 820 may output boundaries corresponding to user 1 preferences by using information about the user 1 previous selection. Similarly, when the user 2 wishes to select a boundary in the next iteration, the second AI model 820 may output boundaries corresponding to user 2 preferences by using information about the user 2 previous selection.

According to an embodiment, the image generating apparatus 300 may provide a result tailored to each user's individual needs and preferences by learning a user's preferred style for each of a plurality of users and outputting a boundary to suit the user's preferred style in the future.

Figure 9:
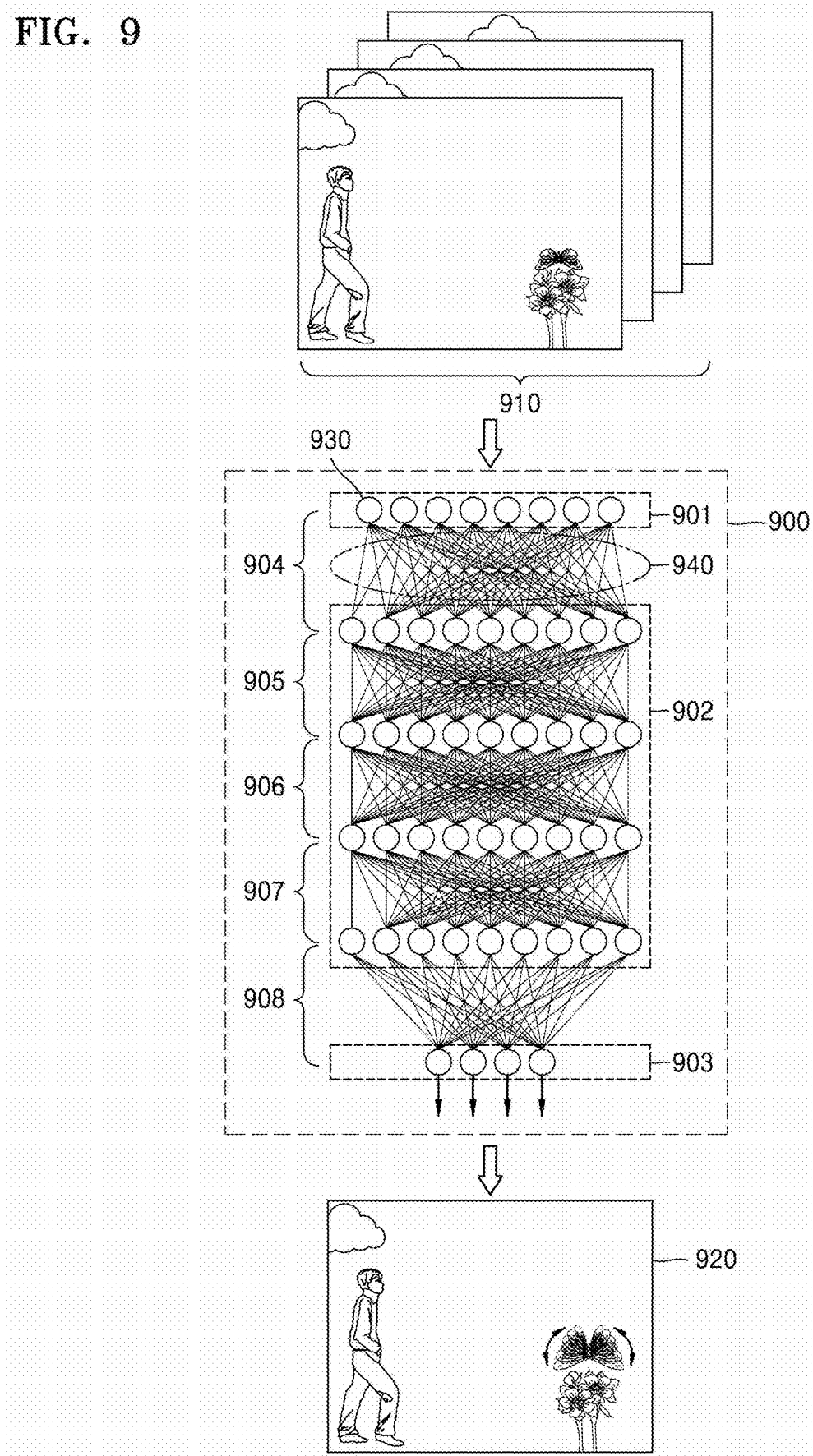
FIG. 9 is a diagram for describing a process by which an image generating apparatus generates a still image from an image by using a neutral network, according to an embodiment.

FIG. 9 is a diagram for describing a process by which the image generating apparatus 300 generates a still image from an image by using a neutral network, according to an embodiment.

Referring to FIG. 9, the image generating apparatus 300 may use an AI model. The AI model may be implemented as a neural network. The neural network 900 may be a model trained to receive an image 910 including a plurality of frames, mask a specific object in the image 910, and generate a natural partial moving image 920 for the specific object.

The image generating apparatus 300 may identify objects in the image 910 including the frames. The image generating apparatus 300 may detect a butterfly that is an object selected by a user among the identified objects. By using the neural network 900, the image generating apparatus 300 may create a plurality of candidate boundaries for masking the detected object, assess the created candidate boundaries, and output one or a plurality of boundaries exhibiting excellent assessment results.

In an embodiment, the neural network 900 may be a DNN including a plurality of hidden layers. The neural network 900 may include a structure in which input data is received, the input data is processed as it passes through hidden layers, and the processed data is output. The neural network 900 may include a CNN.

FIG. 9 illustrates an example in which the neural network 900 is a DNN having a depth corresponding to four hidden layers.

According to an embodiment, the image generating apparatus 300 may perform operations via the neural network 900 to create boundaries for an object and perform assessment on the boundaries. In an embodiment, the neural network 900 may have a form in which an algorithm for creating a boundary for an object included in an image is integrated with an algorithm for assessing the created boundary.

The neural network 900 may be trained by receiving an input of training data. The neural network 900 may be trained based on the training data. Then, the neural network 900, which is trained, may perform an inference operation which is an operation for analyzing an image signal. The neural network 900, which is trained, may perform computations for creating and assessing boundaries. Here, the neural network 900 may be designed in various ways according to a model implementation method (e.g., CNN, etc.), accuracy of results, reliability of results, processing speed and capacity of a processor, etc.

The neural network 900 may include an input layer 901, hidden layers 902, and an output layer OUTPUT LAYER 903 and perform computations for determining a boundary. The neural network 900 may consist of a first layer 1 904 between the input layer 901 and a first hidden layer HIDDEN LAYER1, a second layer 2 905 between the first hidden layer HIDDEN LAYER1 and a second hidden layer HIDDEN LAYER2, a third layer 3 906 between the second hidden layer HIDDEN LAYER2 and a third hidden layer HIDDEN LAYER3, a fourth layer 4 907 between the third hidden layer HIDDEN LAYER3 and a fourth hidden layer HIDDEN LAYER4, and a fifth layer 5 908 between the fourth hidden layer HIDDEN LAYER4 and the output layer OUTPUT LAYER 903.

Each of a plurality of layers forming the neural network 900 may include one or more nodes. For example, the input layer 901 may include one or more nodes 930 for receiving data. FIG. 9 illustrates an example in which the input layer 901 includes a plurality of nodes.

Here, as shown in FIG. 9, two adjacent layers are connected to each other by a plurality of edges (e.g., 940). Because each node has a corresponding weight value, the neural network 900 may obtain output data based on values obtained by performing computations, e.g., multiplications of input signals and weight values.

FIG. 9 shows an example in which each node in one layer is 'fully connected' to all nodes in its adjacent layers. However, according to an embodiment, nodes in one layer may be partially connected only to some nodes in its adjacent layer. In this case, at least one node in one layer may not be connected to at least one node in its adjacent layer.

The neural network 900 may be trained on a plurality of pieces of training data and constructed as a model for recognizing and assessing a boundary for an object. In detail, to increase the accuracy of results output via the neural network 900, the neural network 900 may iteratively perform training in a direction from the output layer 903 to the input layer 901 based on a plurality of pieces of training data and modify weight values in such a way as to increase the accuracy of an output result.

In addition, the neural network 900 having finally modified weight values may be used as an optimal boundary determination model. When receiving an image including an object, the neural network 900 may create boundaries for the object included in the image and output one or more boundaries assessed as an optimal boundary among the created boundaries.

Referring to FIG. 9, the neural network 900 may receive the image 910 including an object and output, as a result, a partial moving image 920 with only the object in the image 910 moving by using an optimal boundary for the object.

FIG. 10 is a flowchart of a method of generating a partial moving image, according to an embodiment. The image generating apparatus 300 may identify objects in an image including a plurality of frames. The image generating apparatus 300 may receive a selection of one of the objects identified in the image from a user. The image generating apparatus 300 may detect an object selected by a user in an image (operation 1010).

The image generating apparatus 300 may create candidate boundaries for the detected object (operation 1020). The image generating apparatus 300 may create a plurality of candidate boundaries for masking the object by using a first AI model. According to an embodiment, the first AI model may include a plurality of segmentation AI models, each of which provides a boundary for the object.

The image generating apparatus 300 assesses the candidate boundaries (operation 1030). The image generating apparatus 300 may assess the candidate boundaries by using a second AI model. According to an embodiment, the second AI model may include at least one of an AI model for performing a technical assessment on input data or an AI model for performing an aesthetic assessment thereon. The image generating apparatus 300 may output one or a plurality of boundaries in a descending order of an assessment score from among the candidate boundaries.

The image generating apparatus 300 may select one of a plurality of boundaries output according to an assessment result (operation 1040). The image generating apparatus 300 may mask the detected object by using the selected boundary (operation 1050). The image generating apparatus 300 may mask the object in one of a plurality of frames and use the frame in which the object is masked as a still image. The image generating apparatus 300 may generate a partial moving image in which the object is moving by using a still image and a plurality of frames (operation 1060).

FIG. 11 is a flowchart of a method of assessing a boundary, according to an embodiment.

Referring to FIG. 11, the image generating apparatus 300 may create a plurality of candidate boundaries for an object detected in an input image. According to an embodiment, the image generating apparatus 300 may create a plurality of candidate boundaries for an object by using various methods. In an embodiment, the image generating apparatus 300 may create candidate boundaries without using an AI model.

The image generating apparatus 300 may assess created plurality of candidate boundaries (operation 1110). The image generating apparatus 300 may perform at least one of a technical assessment or an aesthetic assessment on the candidate boundaries. According to an embodiment, the image generating apparatus 300 may assess boundaries by using an AI model for performing an assessment. The image generating apparatus 300 may select a plurality of boundaries in a descending order of an assessment result score and output the selected boundaries (operation 1120).

The image generating apparatus 300 may receive, from the user, a selection of an optimal boundary from among the output boundaries (operation 1130). The image generating apparatus 300 may receive and learn a result of the user's selection (operation 1140). In other words, the AI model used by the image generating apparatus 300 to perform an assessment may receive information about a user's selection as input data and learn the user's selection. Thereafter, when the user wishes to assess the candidate boundaries again, the AI model used by the image generating apparatus 300 may output a boundary that is more likely to be preferred by the user by using the previously learned user's selection.

According to an embodiment, when there are users, an AI model may receive and learn information about a user's selection for each of the users and output a boundary that is more likely to be preferred by each user by using a user's preferences learned on a per-user basis when the user assesses candidate boundaries in the future.

According to embodiments, functions related to AI may operate via a processor and a memory. The processor may be configured as one or a plurality of processors. In this case, the one or plurality of processors may be a general-purpose processor such as a central processing unit (CPU), an application processor (AP), or a digital signal processor (DSP), a dedicated graphics processor such as a graphical processing unit (GPU) or a vision processing unit (VPU), or a dedicated AI processor such as a neural processing unit (NPU). The one or plurality of processors may control input data to be processed according to predefined operation rules or an AI model stored in the memory. Alternatively, when the one or more processors are a dedicated AI processor, the dedicated AI processor may be designed with a hardware structure specialized for processing a specific AI model.

The predefined operation rules or AI model may be created via a training process. This means that the predefined operation rules or AI model set to perform desired characteristics (or purpose) are created by training a basic AI model on a large number of training data via a learning algorithm. The training process may be performed by an apparatus itself in which AI is performed or via a separate server and/or system. Examples of a learning algorithm may include, but are not limited to, supervised learning, unsupervised learning, semi-supervised learning, and reinforcement learning.

An AI model may be composed of a plurality of neural network layers. Each of the neural network layers has a plurality of weight values and may perform neural network computations via calculations between a result of computations in a previous layer and a plurality of weight values. A plurality of weight values assigned to each of the neural network layers may be optimized by a result of training the AI model. For example, a plurality of weight values may be modified to reduce or minimize a loss or cost value obtained by the AI model during a training process. An artificial neural network may include a DNN, and may be, for example, a CNN, a DNN, an RNN, an RBM, a DBN, a BRDNN, or a DQN but is not limited thereto.

Image generating apparatuses and methods according to some embodiments of the disclosure may be implemented through computer-readable recording media having recorded thereon computer-executable instructions such as program modules that are executed by a computer. The computer-readable recording media may be any available media that can be accessed by a computer and include both volatile and nonvolatile media and both detachable and non-detachable media. Furthermore, the computer-readable recording media may include computer storage media and communication media. The computer storage media include both volatile and nonvolatile media and both detachable and non-detachable media implemented by any method or technique for storing information such as computer-readable instructions, data structures, program modules, or other data. Communication media typically embody computer-readable instructions, data structures, program modules, other data in a modulated data signal, or other transmission mechanism, and includes any information transmission media.

Furthermore, in the specification, the term "unit" may be a hardware component such as a processor or circuit and/or a software component that is executed by a hardware component such as a processor.

Furthermore, the image generating apparatus and method according to the embodiments of the disclosure may be implemented as a computer program product including a recording medium having stored therein a program for performing operations of: obtaining a sentence in multiple languages; and using a multilingual translation model to obtain vector values respectively corresponding to words in the multilingual sentence, convert the obtained vector values to vector values corresponding to a target language, and obtain a sentence in the target language based on the resulting vector values.

According to embodiments, an image generating apparatus and method may create a plurality of boundaries for an object detected in an image by using a plurality of segmentation algorithms.

According to embodiments, an image generating apparatus and method may determine an optimal boundary from among a plurality of boundaries by using an assessment algorithm and generate an image with only a part moving by using the optimal boundary.

According to embodiments, an image generating apparatus and method may learn each user's preferences, select a boundary optimized for each user by reflecting a result of the learning, and generate an image with only a part moving by using the selected boundary.

While embodiments of the disclosure have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:
1. An image generating apparatus comprising:
a display configured to output an image;
a memory configured to store one or more instructions; and
a processor configured to execute the one or more instructions to:
detect an object in an input image including a plurality of frames;
provide a plurality of candidate boundaries for masking the detected object;
identify a boundary of the detected object by assessing the plurality of candidate boundaries;
mask the object in one of the plurality of frames by using the identified boundary; and
generate a partial moving image with the object moving by using the one of the plurality of frames in which the object is masked and the plurality of frames,
wherein each of the plurality of candidate boundaries is a candidate boundary contour of the detected object, and the one of the plurality of frames in which the object is masked and the plurality of frames are included in the input image.

2. The image generating apparatus of claim 1, wherein the processor is further configured to execute the one or more instructions to provide the plurality of candidate boundaries for masking the object detected in the input image by using a first artificial intelligence (AI) model.

3. The image generating apparatus of claim 2, wherein the first AI model includes a plurality of segmentation AI models, and
the processor is further configured to execute the one or more instructions to provide the plurality of candidate boundaries by using the plurality of segmentation AI models.

4. The image generating apparatus of claim 1, wherein the processor is further configured to execute the one or more instructions to assess the plurality of candidate boundaries and obtain a result of the assessing by using a second artificial intelligence (AI) model.

5. The image generating apparatus of claim 4, wherein the second AI model includes at least one of an AI model for performing a technical assessment on input data or an AI model for performing an aesthetic assessment on the input data.

6. The image generating apparatus of claim 4, further comprising a user interface,
wherein the display is further configured to output a preset number of boundaries having high ranks from among the plurality of candidate boundaries according to the result of the assessing, that is obtained by using the second AI model, and
the processor is further configured to execute the one or more instructions to identify, as the boundary, a boundary selected by a user's selection via the user interface from among the preset number of boundaries output by the display.

7. The image generating apparatus of claim 6, wherein the second AI model receives and learns information about the user's selection regarding the boundary and uses a result of the learning when assessing the plurality of candidate boundaries.

8. The image generating apparatus of claim 7, wherein the second AI model classifies and learns the information about the user's selection for each of a plurality of users.

9. The image generating apparatus of claim 1, further comprising a user interface,
wherein the processor is further configured to execute the one or more instructions to:
identify objects that are in motion in the input image by tracking the plurality of frames; and
detect the object selected by a user via the user interface from among the identified objects.

10. An image generating method comprising:
   detecting an object in an image including a plurality of frames;
   providing a plurality of candidate boundaries for masking the detected object;
   identifying a boundary by assessing the plurality of candidate boundaries;
   masking the object in one of the plurality of frames by using the identified boundary; and
   generating a partial moving image with the object moving by using the one of the plurality of frames in which the object is masked and the plurality of frames,
   wherein each of the plurality of candidate boundaries is a candidate boundary contour of the detected object, and the one of the plurality of frames in which the object is masked and the plurality of frames are included in the input image.

11. The image generating method of claim 10, wherein the providing the plurality of candidate boundaries further comprises:
   providing the plurality of candidate boundaries for masking the object detected in the image by using a first artificial intelligence (AI) model.

12. The image generating method of claim 11, wherein the first AI model includes a plurality of segmentation AI models, and
   wherein the providing the plurality of candidate boundaries further comprises providing the plurality of candidate boundaries by using the plurality of segmentation AI models.

13. The image generating method of claim 10, wherein the identifying the boundary further comprises:
   assessing the plurality of candidate boundaries and obtaining a result of the assessing by using a second artificial intelligence (AI) model.

14. The image generating method of claim 13, wherein the second AI model includes at least one of an AI model for performing a technical assessment on input data or an AI model for performing an aesthetic assessment on the input data, and
   the assessing the plurality of candidate boundaries further comprises performing at least one of the technical assessment or the aesthetic assessment on the plurality of candidate boundaries by using the second AI model.

15. The image generating method of claim 13, wherein the identifying the boundary further comprises:
   outputting a preset number of boundaries having high ranks from among the plurality of candidate boundaries according to the result of the assessing, that is obtained by using the second AI model; and
   identifying, as the boundary, a boundary selected by a user's selection from among the output preset number of boundaries.

16. The image generating method of claim 15, wherein the assessing the plurality of candidate boundaries further comprises:
   receiving and learning information about the user's selection regarding the boundary, by the second AI model; and
   using a result of the learning when assessing the plurality of candidate boundaries.

17. The image generating method of claim 16, wherein the receiving and the learning the information about the user's selection further comprises classifying and learning the information about the user's selection for each of a plurality of users.

18. A non-transitory computer-readable recording medium having recorded thereon a program which, when executed by a computer system, causes the computer system to execute an image generating method including:
   detecting an object in an image including a plurality of frames;
   providing a plurality of candidate boundaries for masking the detected object;
   identifying a boundary by assessing the plurality of candidate boundaries;
   masking the object in one of the plurality of frames by using the identified boundary; and
   generating a partial moving image with the object moving by using the one of the plurality of frames in which the object is masked and the plurality of frames,
   wherein each of the plurality of candidate boundaries is a candidate boundary contour of the detected object, and the one of the plurality of frames in which the object is masked and the plurality of frames are included in the input image.

19. The image generating apparatus according to claim 1, wherein the processor is further configured to execute the one or more instructions to:
   assess the plurality of candidate boundaries and obtain a result of the assessing by using an artificial intelligence (AI) model, wherein, as the result of the assessing, the AI model outputs a preset number of boundaries having high ranks among the plurality of candidate boundaries, and
   identify the boundary of the detected object among the preset number of boundaries.

* * * * *